(12) United States Patent
Lyons et al.

(10) Patent No.: US 8,287,987 B1
(45) Date of Patent: *Oct. 16, 2012

(54) BALLISTIC-RESISTANT PANEL INCLUDING HIGH MODULUS ULTRA HIGH MOLECULAR WEIGHT POLYETHYLENE TAPE

(75) Inventors: Fielder Stanton Lyons, Phoenix, AZ (US); Kenneth C. Harding, Midlothian, VA (US); Lisa Owen, Charlotte, NC (US); Joseph Mitchell, Concord, NC (US); Gene C. Weedon, Richmond, VA (US); Jeffrey A. Mears, Chandler, AZ (US); Peter Anthony Russell, Wilmington, OH (US)

(73) Assignee: BAE Systems Tensylon H.P.M., Inc., Monroe, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/134,742

(22) Filed: Jun. 15, 2011

Related U.S. Application Data (63) Continuation of application No. 11/881,863, filed on Jul. 30, 2007, now Pat. No. 7,964,267, and a continuation-in-part of application No. 11/821,659, filed on Jun. 25, 2007, now Pat. No. 7,976,930, and a continuation-in-part of application No. 11/787,094, filed on Apr. 13, 2007, now Pat. No. 7,964,266.

(51) Int. Cl.
*B29C 65/00* (2006.01)
*B32B 37/00* (2006.01)
*B32B 37/22* (2006.01)

(52) U.S. Cl. ..... 428/156; 156/164; 156/194; 156/304.6; 428/107; 428/213; 428/364; 442/135

(58) Field of Classification Search .................. 428/156, 428/107, 213, 364; 139/383 R; 442/135
See application file for complete search history.

(56) References Cited

U.S. PATENT DOCUMENTS

| 5,437,905 | A | 8/1995 | Park | |
| 6,539,983 | B2 * | 4/2003 | Khokar | 139/383 A |
| 6,951,685 | B1 | 10/2005 | Weedon et al. | |
| 2002/0037391 | A1 * | 3/2002 | Harpell et al. | 428/103 |
| 2005/0153098 | A1 * | 7/2005 | Bhatnagar et al. | 428/113 |
| 2005/0197020 | A1 | 9/2005 | Park et al. | |
| 2011/0174147 | A1 * | 7/2011 | Steeman et al. | 89/36.02 |

FOREIGN PATENT DOCUMENTS

EP 1627719 A1 2/2006

\* cited by examiner

*Primary Examiner* — Brent O'Hern (57) ABSTRACT

A ballistic-resistant panel in which the entire panel or a strike-face portion thereof is formed of a plurality of sheets of high modulus high molecular weight polyethylene tape. The sheets of high modulus polyethylene tape can be in the form of cross-plied laminated layers of tape strips or a woven fabric of tape strips. The strips of UHMWPE tape include a width of at least one inch and a modulus of greater than 1400 grams per denier. The ballistic-resistant panel may include a backing layer of conventional high modulus fibers embedded in resin. A wide variety of adhesives were found acceptable for bonding the cross-plied layers of high modulus polyethylene tape together for forming the ballistic-resistant panels of the present invention.

19 Claims, 5 Drawing Sheets

BALLISTIC-RESISTANT PANEL INCLUDING HIGH MODULUS ULTRA HIGH MOLECULAR WEIGHT POLYETHYLENE TAPE

This application is a Continuation of U.S. patent application Ser. No. 11/881,863, filed on Jul. 30, 2007, now U.S. Pat. No. 7,964,267, and is a Continuation-In-Part of U.S. patent application Ser. No. 11/821,659, filed on Jun. 25, 2007, now U.S. Pat. No. 7,976,930, and is a Continuation-In-Part of U.S. patent application Ser. No. 11/787,094, filed on Apr. 13, 2007, now U.S. Pat. No. 7,964,266, of which the entire contents of said patents are incorporated herein in their entirety by reference thereto.

FIELD OF THE INVENTION

The present invention relates to survivability enhancement and more particularly to a ballistic laminate constructed of a plurality of layers of non-fibrous high modulus ultra high molecular weight polyethylene.

BACKGROUND OF THE INVENTION

Survivability enhancement is a well-known objective for armored vehicles or fixed or mobile armored structures in a combat or other high threat environment. If a high-energy projectile strikes a vehicle, the survivability of the occupants and the vehicle can be compromised by the release of spall, which is a spray of high velocity metallic or ceramic debris into the vehicle's interior. Vehicles, ships, aircraft, or structures in a high threat environment are therefore frequently equipped with a spall liner, which is designed to suppress the spall generated when a projectile penetrates the vehicle's interior.

Spall liners are typically comprised of a compressed panel. The compressed panel usually includes a plurality of layers of high modulus, high tensile strength fabric bonded together by a resinous adhesive. If a projectile penetrates the armor of a vehicle, the spall liner absorbs the force of the projectile, with each separate layer delaminating and absorbing some portion of the force of the projectile and thereby dissipating the energy of the projectile as it advances through the spall liner.

Although many different spall liners have been proposed, further enhancements in spall suppression are highly desirable for increasing survivability of armored vehicles and structures.

SUMMARY OF THE INVENTION

The invention is a ballistic-resistant panel formed of a plurality of sheets of high modulus high molecular weight polyethylene tape. The sheets of high modulus polyethylene tape include tape strips bonded together at their edges by heat and pressure or by thermoplastic adhesive combined with heat and pressure. The strips of UHMWPE (ultra high molecular weight polyethylene) tape include a width of at least one inch and a modulus of greater than 1400 grams per denier. The ballistic-resistant panel may include a backing layer of conventional high modulus fibers embedded in resin. A wide variety of adhesives were found acceptable for bonding the sheets of high modulus polyethylene tape together for forming the ballistic-resistant panels of the present invention.

OBJECTS AND ADVANTAGES

The ballistic-resistant panel formed of UHMWPE (ultra high molecular weight polyethylene) Tensylon tape of the present invention includes several advantages over the prior art, including:

(1) The ballistic resistance is improved over ballistic panels formed entirely of conventional ballistic fibers.

(2) The UHMWPE Tensylon tape of the present invention can be produced at a substantially lower price than conventional ballistic fibers. Significant cost savings are therefore obtained by replacing a portion of the conventional high modulus component with the high modulus UHMWPE tape of the present invention.

(3) Forming the ballistic-resistant panel or the strike-face portion of monolithic UHMWPE tape reduces or eliminates joints or seams, thereby improving the ballistic resistance of the ballistic laminate.

(4) Forming the strike-face portion of monolithic UHMWPE tape provides structural support to the laminate and reduces delamination after a ballistic event.

(5) The UHMWPE tape of the present invention may be formed into sheets or layers by weaving the wide tapes into a woven structure such as a simple basket weave or by simply butting together the strips of tape edge to edge, or by overlapping the edges slightly, and then pressing with pressure, heat and pressure, or by coating with adhesive and pressing. This is vastly simpler and cheaper than forming a sheet or layer from fibers, which requires many more individual ends or packages and lamination with an adhesive or processing by weaving, knitting, or cross-stitching.

(6) The amount of adhesive required to mold a ballistic laminate with a strike-face according to the present invention is significantly lower than that required for a ballistic laminate formed of conventional ballistic fibers. The smooth surface area of the high modulus tape used in the strike-face portion of the ballistic-resistant panel enables a lower adhesive to UHMWPE ratio than is available with ballistics panels formed from conventional UHMWPE. The effectiveness of conventional ballistic-resistant panels is generally negatively affected by the higher adhesive ratios, as the adhesive portion adds weight to the laminate but does not contribute to the ballistic resistance unless the adhesive is specifically designed to produce controlled delamination.

These and other objects and advantages of the present invention will be better understood by reading the following description along with reference to the drawings.

TABLE OF NOMENCLATURE

The following is a listing of part numbers used in the drawings along with a brief description:

| Part Number | Description |
|---|---|
| 20 | laminator/fuser |
| 22 | unwind shaft |
| 24 | Tensylon tape |
| 26 | second unwind shaft |
| 28 | adhesive |
| 30 | third unwind shaft |
| 32 | fourth unwind shaft |
| 34 | silicone release paper |
| 36 | nip rolls |
| 38 | adhesive coated Tensylon web |
| 40 | fusing oven |
| 42 | chilled platen |
| 44 | adhesive coated unidirectional tape |
| 50 | laminator/fuser |
| 52 | adhesive coated release roll |
| 54 | release liner |
| 60 | top sheet of adhesive-coated unitape |
| 62 | bottom sheet of adhesive-coated unitape |
| 64 | strip of Tensylon unidirectional tape |
| 66 | joint areas |
| 68 | adhesive layer |
| 70 | cross-plied sheet of adhesive-coated Tensylon |
| 72 | cross-plied sheet of adhesive-coated Tensylon |
| 74 | cross-plied sheet of convention fibers in resin |
| 76 | cross-plied sheet of convention fibers in resin |

DETAILED DESCRIPTION OF THE INVENTION

The present invention relates to ballistic laminates having a plurality of layers of high modulus material, either all or some portion of which layers are constructed of non-fibrous, high modulus, ultra high molecular weight polyethylene tape of the type described in U.S. patent application Ser. No. 11/787,094, filed on Apr. 13, 2007, the contents of which are incorporated herein in their entirety by reference thereto. The non-fibrous, high modulus, UHMWPE tape is produced by Tensylon High Performance Materials, Inc. of Monroe, N.C., and sold under the name TENSYLON®. As used in this application, the term "high modulus" refers to materials having a modulus greater than 1,000 grams per denier (gpd).

In order to form an improved strike-face for a ballistic-resistant panel according to the present invention, adhesive was applied to one side of a plurality of webs of unidirectional UHMWPE tape. The webs of adhesive-coated unitape were bonded into a unidirectional or unitape sheet, sheeted, and then cross-plied with additional sheets of adhesive-coated unitape. The cross-plied sheets were molded by heat and pressure into a ballistic laminate. Several conventional adhesives were tested for their effectiveness in forming a ballistic laminate. The test procedure included the following steps:

(1) Comparing various adhesives for bonding UHMWPE tape for the purpose of forming unidirectional material for use in bidirectional cross ply;
(2) Evaluating unidirectional tape lamination capability and consolidation capability;
(3) Forming each adhesive variant into a nominal 2.0 pounds per square foot (psf) test panel at 150 psi and into a second 2.0 psf panel at 3000 psi; and
(4) Testing the resultant test panels for ballistic performance.

In order to test the effectiveness of TENSYLON® non-fibrous, high modulus UHMWPE tape as a high modulus component in ballistic-resistant panels, adhesive was applied to one side of Tensylon 19,000 denier tape, hereinafter "Tensylon tape". The 19,000 denier Tensylon tape included nominal dimensions of 1.62 inches in width, 0.0025 inch in thickness, and a tensile modulus of at least 1,400 grams per denier (gpd). Some of the adhesives were in the form of adhesive scrims, which were laminated to one side of the Tensylon tape, and others were resinous adhesive dispersed in a solvent, which was coated on a release film and then transferred to one side of the Tensylon tape. Preferably, the Tensylon tape has viscosity-average molecular weight of at least 2,000,000, a width of at least 1.0 inch, a thickness of between 0.0015 and 0.004 inch, a width to thickness ration of at least 400:1, a denier of 6,000 or greater, and a modulus of greater than 1,400 grams per denier.

Figure 1:
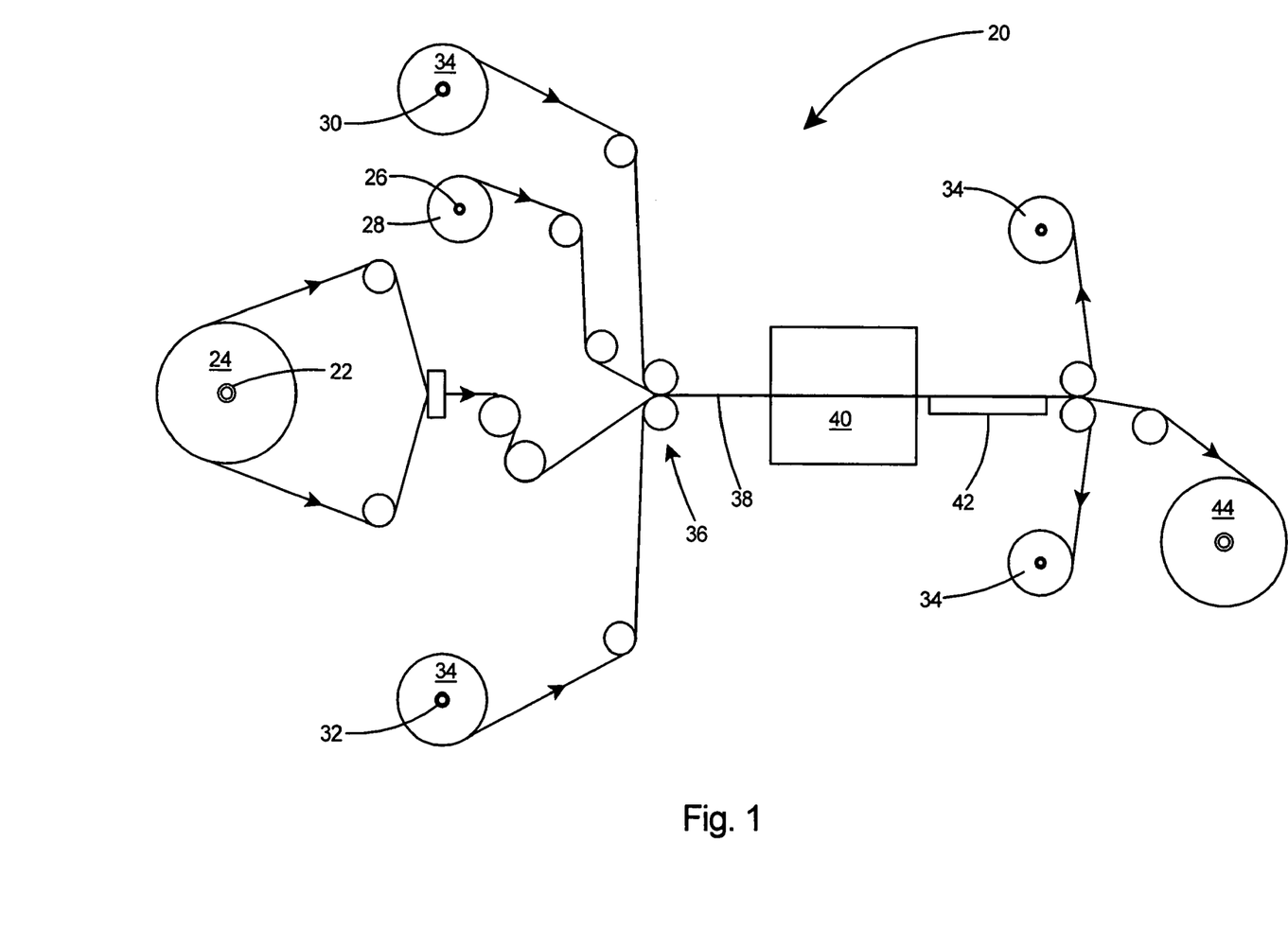
FIG. 1 is a schematic representation of a production process for laminating UHMWPE tape with adhesive in order to produce layers for forming a ballistic laminate according to the present invention.

With reference to FIG. 1, there is shown a laminator/fuser 20 for laminating adhesive scrims to the Tensylon tape. The laminator/fuser 20 included an unwind shaft 22 with eight rolls of 1.62-inch wide Tensylon tape 24 assembled thereon. Each roll included independent brake tension controls. A second unwind shaft 26 contained a roll of adhesive 28. A third unwind shaft 30 and forth unwind shaft 32 contained rolls of silicone release paper 34. The Tensylon tape 24, adhesive 28, and silicone release paper 34 were laminated together at nip rolls 36 thereby forming adhesive coated Tensylon web 38 sandwiched between the two silicone release liners 34. The silicone release liners 34 prevented the adhesive coated Tensylon web 38 from sticking to any rollers in the oven during fusing. The adhesive coated Tensylon web 38 was then conveyed through a fusing oven 40 to cure the thermoplastic adhesive. A chilled platen 42 cooled the Tensylon/adhesive laminate 38 as it exited the fusing oven 40. After cooling, the release liners 34 were removed from the Tensylon/adhesive laminated web 38 thereby formed an adhesive-coated roll of unidirectional Tensylon 44 at a nominal width of 13.0 inches. The laminator/fuser operated at a line speed of 10 to 20 feet per minute and with fusing oven 40 temperatures between 230° F. and 260° F.

Figure 2:
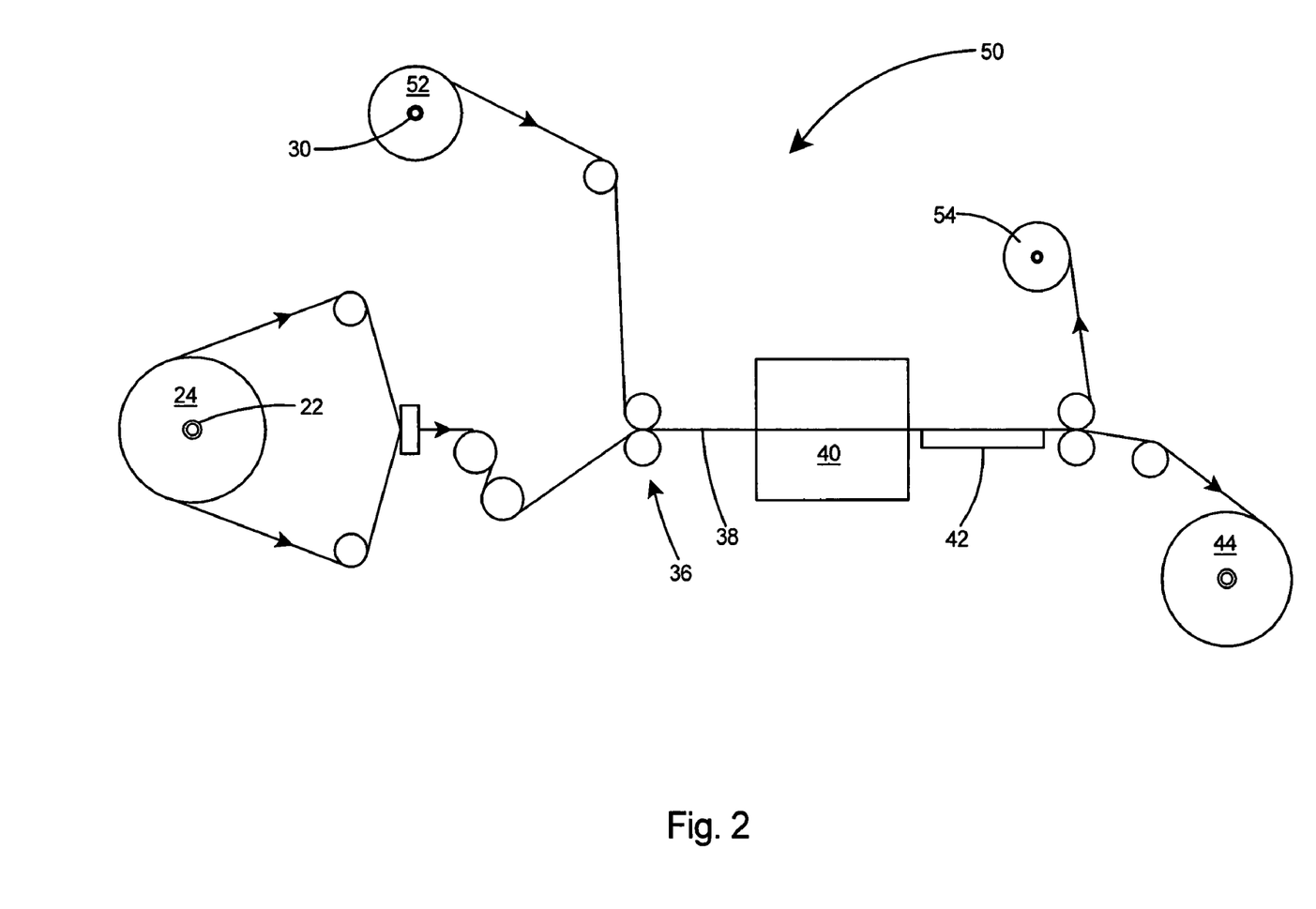
FIG. 2 is a schematic representation of a second production process for laminating UHMWPE tape with adhesive for the production of a ballistic laminate according to the present invention.

For those adhesives in the form of a resin suspended in a solvent, the resin was applied to one side of a silicone release sheet. With reference to FIG. 2, there is shown a laminator/fuser 50 in which the adhesive-coated silicone release roll 52 was mounted on an unwind shaft 30 with Tensylon tape 24 on unwind shaft 22. The adhesive-coated silicone release web 52 was then nipped against the 1.62-inch wide Tensylon webs that were butt-jointed together at the nip 36. At the nip the adhesive was transferred to the Tensylon web and the eight 1.62-inch Tensylon webs were fused into one sheet as has been described in U.S. patent application Ser. No. 11/787,094, filed Apr. 13, 2007, the contents of which are incorporated herein in their entirety by reference thereto. The adhesive-coated Tensylon 38 was then conveyed through the remainder of the laminator/fuser 50 and the release liner 54 removed from the 13.0-inch nominal width Tensylon/adhesive-coated web 38.

The specific adhesives tested and significant measured properties are presented in Table 1 below:

TABLE 1

Adhesives Tested for effectiveness in bonding Tensylon tape into a ballistic laminate:

| Adhesive Code | Chemical Composition | Melt Temperatures (degrees C.) | Measured Coat Weight (gsm) |
|---|---|---|---|
| A1 | Polyamide | 100-115 | 6.2 |
| B1 | Polyolefin | 93-105 | 6.0 |
| C1 | Ethylene Vinyl Acetate Copolymer | 98-112 | 4.7 |
| D1 | Polyurethane | 70-100 | 16.7 |
| E1 | Ethylene Acrylic Acid Copolymer | 88-105 | N/A |
| F1 | Polystyrene Isoprene Copolymer | N/A | 6.0 |
| G1 | Polyamide | N/A | 5.0 |
| H1 | Polyurethane | N/A | 5.0 |

The adhesives tested included Polyethylene-PO4401 (A1), Polyethylene-PO4605 (B1), Polyurethane-DO187H (D1), and Polyethylene-D0188Q (E1), which are all available from Spunfab, Ltd. of Cayahoga Falls, Ohio; Kraton D1161P (F1), which is available from Kraton Polymers U.S., LLC of Houston, Tex.; Macromelt 6900 (G1), which is available from Henkel Adhesives of Elgin, Ill.; and Noveon-Estane 5703 (H1), which is available from Lubrizol Advanced Materials, Inc. of Cleveland, Ohio. Adhesives A1 through E1 were applied to the Tensylon tape by the laminator/fuser 20 depicted in FIG. 1. Adhesives F1 through H1, which were dispersed in solvents, were coated on a release film and then transferred to one side of the Tensylon tape.

Figure 3:
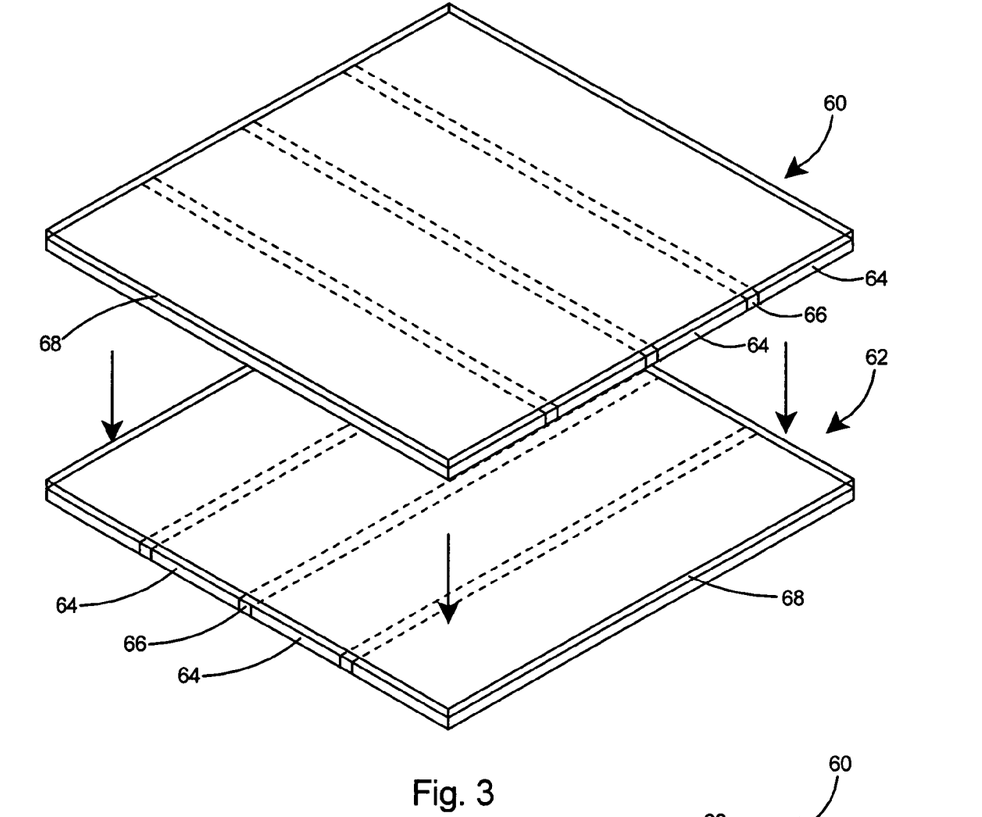
FIG. 3 is a schematic representation in perspective view of two sheets or layers of adhesive-coated unidirectional non-fibrous UHMWPE tape prior to being fused together with heat and pressure to form a cross-plied laminate for use in the construction of a ballistic laminate according to the present invention.
Figure 4:
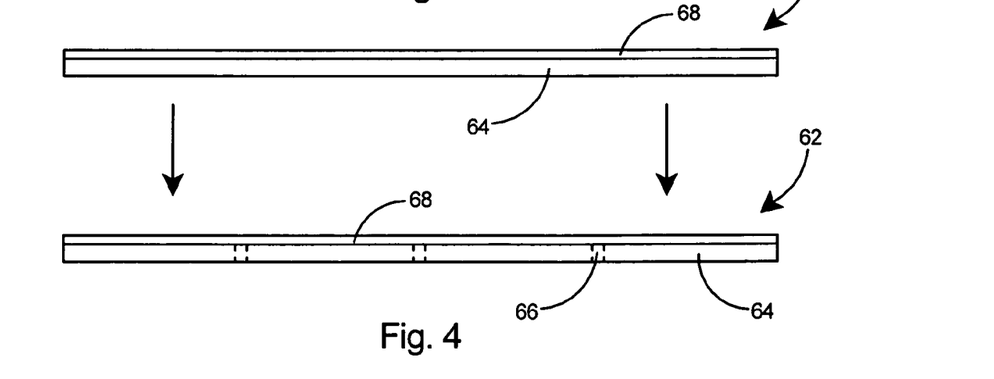
FIG. 4 is a schematic representation as viewed from the side of two sheets of unidirectional non-fibrous UHMWPE tape prior to being fused together with heat and pressure to form a cross-plied laminate.

The adhesive-coated unidirectional Tensylon tape, commonly termed "unitape" and consisting of eight strips of UHMWPE tape fused at their edges, was then cut into 12-inch by 12-inch sheets. FIGS. 3 and 4 depict two sheets 60 and 62 of adhesive-coated unitape consisting of strips of Tensylon UHMWPE tape 64 fused at joint areas 66. The joint areas 66 are depicted for clarity in describing the direction of orientation of the UHMWPE tape in FIG. 3, it should be understood that the UHMWPE tape strips 64 are rendered substantially transparent when bonded as described herein therefore making the joint areas 66 appear homogenous with the sheet. The bonding of non-fibrous, high modulus, ultra high molecular weight polyethylene Tensylon tape is described in detail in U.S. patent application Ser. No. 11/787,094, filed on Apr. 13, 2007, which has been incorporated herein by reference. The top sheet 60 of adhesive-coated unitape is oriented at 90° with respect to the bottom sheet 62. An adhesive layer 68, shown as a transparent layer of adhesive in FIGS. 3 and 4, is bonded to each sheet 60, 62 in the manner described above. As the adhesive is thermoplastic, the two sheets 60, 62 of adhesive-coated unitape are pressed together with heat and pressure which causes the two sheets to bond together into a cross-plied sheet of Tensylon UHMWPE with the bonded sheets cross-plied in the 0° and 90° direction.

To form a ballistic-resistant panel, cross-plied sheets of adhesive-coated Tensylon were stacked until a stack of cross-plied Tensylon of approximately 2.0 psf (pounds per square foot) was obtained. Several of the nominal 2.0 psf stacks were pressed at a pressure of 150 psi and several at a pressure of 3,000 psi. The press cycle included 30 minutes at a temperature of 250° F. to 260° F. and cooling under full pressure to below 120° F. before release thereby forming ballistic-resistant panels of nominally 2.0 psf areal density.

Figure 5:
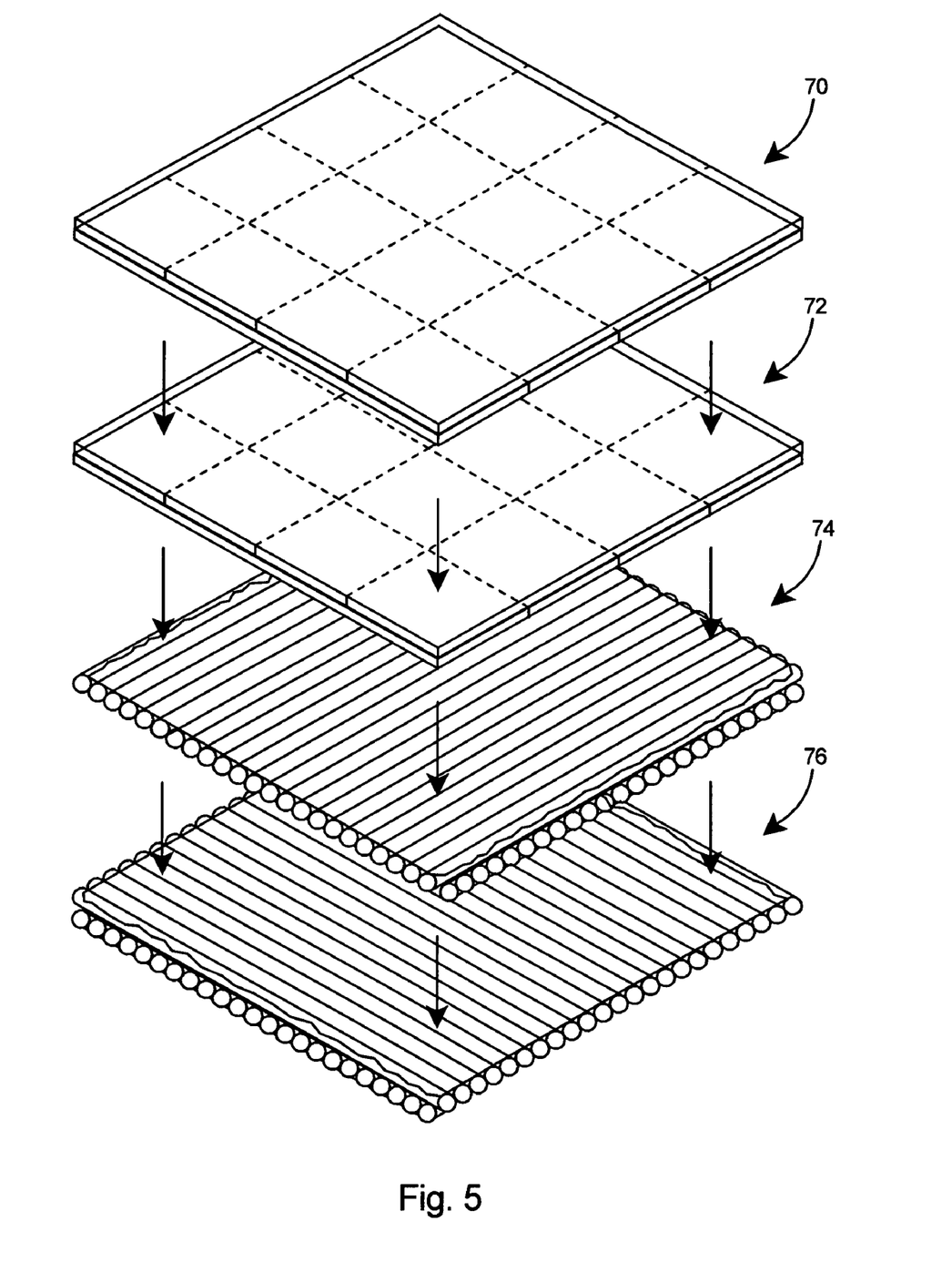
FIG. 5 is an illustration depicting the forming of a ballistic-resistant panel with cross-plied sheets of adhesive-coated Tensylon and cross-plied sheets of conventional high modulus fibers embedded in resin.

With reference to FIG. 5, a simplified illustration depicts the forming of the preferred embodiment of a ballistic-resistant panel with cross-plied sheets or laminates of adhesive-coated Tensylon 70 and 72 and cross-plied sheets of conventional high modulus fibers embedded in resin 74 and 76. The cross-plied sheets of adhesive-coated Tensylon 70 and 72 are stacked on top of stacked cross-plied sheets of conventional high modulus fibers 74 and 76 and pressure and heat are applied to bond the sheets into a ballistic-resistant panel. As an example, to form a 2.0 psf ballistic-resistant panel having a 50/50 ratio by weight of Tensylon and conventional fiber, a plurality of sheets of cross-plied conventional fibers embedded in resin are laid down until a weight of approximately 2.0 psf is obtained. Cross-plied sheets of adhesive-coated Tensylon are then stacked on top of the cross-plied sheets of conventional high modulus fibers until a total weight of approximately 2.0 psf was obtained. Heat and pressure are then applied to fuse the cross-plied layers of Tensylon and conventional fibers into a ballistic-resistant panel.

The ballistic-resistant panels were then tested for ballistic resistance. Projectiles of .30 caliber FSP (Fragment Simulated Projectile) per MIL-P-46593A were fired at the 2.0 psf test panels to obtain ballistics properties of the panels bonded with the various adhesives. The velocities in fps (feet per second) at which 50% of the projectiles failed to penetrate the target ($V_{50}$) were determined per MIL-STD-662F. Data for the resultant ballistic-resistant panels formed at 150 psi are shown in Table 2 and data for the resultant ballistic-resistant panels formed at 3,000 psi are shown in Table 3 below:

TABLE 2

Data Results for Ballistic-resistant panels of UHMWPE tape formed with various adhesives at Molding Pressure 150 psi and Ballistic Test Results:

| Adhesive Description | Adhesive ID | Adhesive Weight (gsm) | Adhesive (wt %) | Areal Density (psf) | Average 0.30 Cal FSP $V_{50}$ (fps) |
|---|---|---|---|---|---|
| A1 | Polyamide | 5.93 | 10.4 | 2.01 | 1873 |
| A1 | Polyamide | 3.10 | 5.7 | 1.88 | 1984 |
| C1 | Ethylene Vinyl Acetate Copolymer | 5.93 | 10.4 | 2.03 | 1957 |
| D1 | Polyurethane | 15.25 | 22.9 | 2.02 | 1818 |
| E1 | Ethylene Acrylic Acid Copolymer | 5.93 | 10.4 | 2.02 | 1832 |
| B1 | Polyolefin | 5.93 | 10.4 | 2.01 | 1937 |
| B1 | Polyolefin | 3.10 | 5.7 | 2.05 | 1878 |
| F1 | Polystyrene-Isoprene Copolymer | 7.40 | 12.6 | 2.01 | 2057 |
| F1 | Polystyrene-Isoprene Copolymer | 5.70 | 10.0 | 2.07 | 2124 |
| Dyneema HB2 | Polystyrene-Isoprene | — | — | 1.99 | 2275 |
| Dyneema HB25 | Polyurethane | — | — | 2.00 | 2192 |

TABLE 3

Data Results for Ballistic-resistant panels of UHMWPE tape formed with various adhesives at Molding Pressure 3,000 psi and Ballistic Test Results:

| Adhesive Description | Adhesive ID | Adhesive Weight (gsm) | Adhesive (wt %) | Areal Density (psf) | Average 0.30 Cal FSP $V_{50}$ (fps) |
|---|---|---|---|---|---|
| A1 | Polyamide | 5.93 | 10.4 | 1.94 | 1915 |
| C1 | Ethylene Vinyl Acetate Copolymer | 5.93 | 10.4 | 1.96 | 1963 |
| B1 | Polyolefin | 5.93 | 10.4 | 1.96 | 2014 |
| B1 | Polyolefin | 3.10 | 5.7 | 2.02 | 1970 |
| F1 | Polystyrene-Isoprene Copolymer | 7.40 | 12.6 | 2.03 | 2242 |
| F1 | Polystyrene-Isoprene Copolymer | 5.70 | 10.0 | 2.02 | 2136 |
| Dyneema HB2 | Polystyrene-Isoprene | — | — | 2.00 | 2541 |
| Dyneema HB25 | Polyurethane | — | — | 2.00 | 2386 |

A summary of the data suggest that the 3000 psi ballistic-resistant panels molded with adhesives A1, B1, and C1 rated slightly higher for ballistic performance than did the 150 psi panels. Adhesives B1 and C1 were essentially equal in performance. The $V_{50}$ results suggest that all of the test panels were acceptable for ballistic resistance of .30 caliber fragment simulated projectiles.

Ballistic-resistant panels were then prepared to test the performance of Tensylon tape versus conventional high modulus fibers. Dyneema HB25 cross-plied fibers embedded in resin, available from DSM Dyneema B.V., Urmond, the Netherlands, were formed into a 2.0-psf panel. A panel formed of 100% HB25 as the high modulus component was used as a control sample or baseline. A nominal 2.0-psf panels was also formed of 100% high modulus Tensylon tape. Various other combinations of Tensylon tape and HB25 were formed into ballistic-resistant panels to test the ballistic resistance of panels with various amounts of Tensylon tape in place of the conventional high modulus component and to also test whether the Tensylon tape was more effective in various configurations, such as 1) alternating sheets of Tensylon tape and conventional high modulus component, 2) Tensylon tape as a strike-face at the front of the ballistic-resistant panel, and 3) Tensylon tape as the backing material with conventional high modulus component forming the strike face, and 4) varying the ratio of Tensylon tape to conventional high modulus component. Several of these variations were molded into panels at 150 psi and 250° F. as shown in Table 4 below, and several molded into panels at 150 psi and 210° F. as shown in Table 5. The ballistic-resistant panels were tested with .30 caliber FSP rounds and the $V_{50}$ results recorded.

Table 4 includes, left to right in columns 1 to 7:1) the high modulus composition, 2) the baseline $V_{50}$ test result for panels formed of one high modulus component, 3) the $V_{50}$ test result for panels formed with a Tensylon strike-face, 4) the $V_{50}$ test result for panels formed with HB25 as the strike-face, 5) the calculated $V_{50}$, and 6) the delta $V_{50}$ which is the difference between the calculated $V_{50}$ and the actual $V_{50}$ recorded in columns 3, 4, or 5. The calculated $V_{50}$ is determined by the Rule of Mixtures wherein the property of a composite is proportional to the volume fractions of the materials in the composite, thus the calculated $V_{50}$ for a 50/50 ratio of Tensylon C and HB25 is $V_{50}$=0.5 (1650)+0.5 (2250) or $V_{50}$ (calculated)=1950. The Tensylon C (Ten C) and Tensylon A (Ten A) were panels molded with different adhesives.

Thus, if the Delta $V_{50}$ is within plus or minus 50 fps, the Rule of Mixtures is a good predictor of the final $V_{50}$ value, and there is no effect from the manner in which the separate high modulus components are combined in the panel. Thus the $V_{50}$ for alternating layers of Tensylon tape and HB25, which is represented by line 4 of the table, is predicted by the Rule of Mixtures. However, if the absolute value of the Delta $V_{50}$ is significantly greater than 50 fps for several of the test panels, it implies that the order in which the high modulus components are arranged in the ballistic-resistant panel is statistically significant. Thus, where the Tensylon tape is placed with respect to front or back in the ballistic-resistant panel has a significant effect on the ballistic performance of the panel. A Delta $V_{50}$ that is greater than +50 fps indicates a higher ballistic resistance result than expected by the Rule of Mixtures and thus an advantageous configuration of high modulus components within the panel. A Delta $V_{50}$ that is less than −50 fps indicates a lower ballistic resistance result than expected by the Rule of Mixtures and thus an undesirable configuration of high modulus components within the panel.

Therefore, it can be concluded from the test results in Table 4 that the compositions in rows 5 and 10 through 12 are advantageous for producing a panel with high ballistic resistance. Column 1 shows the high modulus composition of these panels are 25% Tensylon/50% HB25/25% Tensylon (panel 5), 25% Tensylon/75% HB25 (panels 10 and 11), and 50% Tensylon/50% HB25 (panel 12). Results therefore show that a strike-face consisting of high modulus UHMWPE Tensylon tape improves the performance of ballistic-resistant panels. In the final ballistic-resistant panel, the adhesive was less than 20 weight percent of the total weight of the panel.

TABLE 4

Test Results of 2.0 psf Ballistic-resistant panels at Molding Pressure 150 psi and 250° F. Temperature:

| High Modulus Component | Ratio (%) | Baseline 0.30 cal. $V_{50}$ (fps) | Tensylon Front $V_{50}$ (fps) | Tensylon Back $V_{50}$ (fps) | Calculated $V_{50}$ (fps) | Delta $V_{50}$ (fps) |
|---|---|---|---|---|---|---|
| HB25 | 100 | 2250 | — | — | — | — |
| Tensylon C | 100 | 1650 | — | — | — | — |
| Tensylon A | 100 | 1933 | — | — | — | — |
| TenC/HB25 alt.* | 50/50 | — | 1965 | — | 1950 | +15 |
| TenC/HB25/TenC | 25/50/25 | — | 2211 | — | 1950 | +261 |
| HB25/TenC/HB25 | 25/50/25 | — | — | 1989 | 1950 | +39 |
| HB25/TenA | 50/50 | — | — | 1933 | 2092 | −159 |
| HB25/TenC | 50/50 | — | — | 1750 | 1950 | −200 |
| HB25/TenC | 75/25 | — | — | 1852 | 2101 | −249 |
| TenC/HB25 | 25/75 | — | 2333 | — | 2101 | +232 |
| TenA/HB25 | 25/75 | — | 2255 | — | 2151 | +104 |
| TenC/HB25 | 50/50 | — | 2217 | — | 1950 | +267 |

TenC/HB25 alt.* — alternating layers of Tensylon C and HB25.

Table 5 includes ballistic test results for panels of various compositions of Tensylon UHMWPE tape and HB25 fibers molded at 150 psi and 210° F. The ballistic-resistant panels were tested with .30 caliber FSP rounds and the $V_{50}$ velocities recorded.

TABLE 5

Test Results of 2.0 psf Ballistic-resistant panels at Molding Pressure 150 psi and 210° F. Temperature:

| High Modulus Component | Ratio (%) | Baseline 0.30 cal. $V_{50}$ (fps) | Tensylon Front $V_{50}$ (fps) | Tensylon Back $V_{50}$ (fps) | Calculated $V_{50}$ (fps) | Delta $V_{50}$ (fps) |
|---|---|---|---|---|---|---|
| HB25 | 100 | 2154 | — | — | — | — |
| Tensylon A | 100 | 1986 | — | — | — | — |
| HB25/TenA | 50/50 | — | — | 1909 | 2070 | −161 |
| TenA/HB25 | 50/50 | — | 2289 | — | 2070 | +219 |
| TenA/HB25 | 25/75 | — | 2300 | — | 2112 | +188 |

As reference to Table 5 shows, the ballistic resistance for the 2.0 psf panels molded at 150 psi and 210° F. was improved significantly with Tensylon UHMWPE tape used as the strike face of the panel. The improvement in ballistic resistance with the addition of Tensylon tape as the strike face therefore occurred with panels molded at 250° F. (Table 4) as well as at 210° F. (Table 5).

Table 6 includes ballistic test results for 3.8 nominal psf ballistic-resistant panels composed of Tensylon UHMWPE tape and aramid fabric molded with SURLYN® resin at 150 psi and 250° F. SURLYN® is an ethylene/methacrylic acid copolymer available from DuPont Packaging and Industrial Polymers of Wilmington, Del. The aramid fabric is produced commercially by Barrday, Inc. under the trade name Barrday Style 1013. The aramid fabric was composed of 3,000 denier Kevlar® 29 in fabrics of 14 oz/yd² weight. One ply of 1.5-mil CAF film (SURLYN® resin) was used between each ply of Tensylon tape. (As a result of aramid fabric and Tensylon tape weight variances, it was difficult to match areal densities. The ballistic-resistant panels were tested with .30 caliber FSP rounds and the $V_{50}$ velocities recorded.

TABLE 6

Test Results of 3.3 psf Ballistic-resistant panels at Molding Pressure 150 psi and 250° F. Temperature:

| High Modulus Component | Ratio (%) | Baseline 0.30 cal. FSP $V_{50}$ (fps) | Tensylon Front $V_{50}$ (fps) | Tensylon Back $V_{50}$ (fps) | Calculated $V_{50}$ (fps) | Delta $V_{50}$ (fps) |
|---|---|---|---|---|---|---|
| Aramid | 100 | 2491 | — | — | — | — |
| Tens/Ara alt.* | 50/50 | 2320 | — | — | 2405 | −85 |
| Tens/Ara | 50/50 | — | 2632 | — | 2405 | +227 |
| Ara/Tens | 50/50 | — | — | 2275 | 2405 | −130 |

Tens/Ara alt.* — alternating layers of Tensylon and Aramid.

As shown in Table 6, the test panel with a Tensylon tape strike face had ballistic resistance of 2632 fps, which was significantly higher than that predicted by the Rule of Mixtures.

Table 7 includes ballistic test results for 3.8 nominal psf ballistic-resistant panels composed of Tensylon UHMWPE tape and HB25 and tested with an NIJ Level III M80 ball projectile (U.S. military designation for 7.62 mm full metal jacketed bullet).

TABLE 7

Test Results - 3.8 psf Ballistic-resistant panels, M80 Ball:

| High Modulus Component | Ratio (%) | Molding Pressure (psi) | Areal Density (psf) | Calculated M80 ball $V_{50}$ (fps) | $V_{50}$ M80 ball (fps) | Delta $V_{50}$ (fps) |
|---|---|---|---|---|---|---|
| HB25 | 100 | 150 | 4.01 | — | 2965 | — |
| Tensylon | 100 | 150 | 4.00 | — | 2107 | — |
| Tens/HB25 alt.* | 50/50 | 150 | 3.80 | 2565 | 2416 | −149 |
| Tensylon/HB25 | 50/50 | 150 | 3.85 | 2565 | 2880 | +315 |
| Tensylon/HB25 | 25/75 | 150 | 3.85 | 2750 | 2897 | +147 |

Tens/HB25 alt.* — alternating layers of Tensylon and HB25.

As shown in Table 7 for nominal 3.8 psf composite ballistic-resistant panels, the Tensylon UHMWPE tape had a beneficial effect when placed as the strike-face of the ballistic-resistant panel, including a V50 velocity of 2880 fps for the ballistic-resistant panel in which the Tensylon tape comprised the strike-face and 50% of the high modulus component and a V50 velocity of 2897 fps for the ballistic-resistant panel in which the Tensylon tape comprised the strike-face and 25% of the high modulus component.

Table 8 includes ballistic test results for a spall liner for simulated armor with facings of aluminum and High Hardness Steel (HHS) and various backing compositions including various weights of HB25 and various compositions including HB25 and Tensylon tape. All of the armor designs including Tensylon tape as a high modulus component had positive results for rifle threat relative to the requirement.

TABLE 8

Ballistic Data Summary-Spall Liner:

| Armor Design | | Total AD (psf) | Rifle Threat Relative to Rqmt.* (fps) | Frag.** Threat Relative to Rqmt. (fps) |
|---|---|---|---|---|
| Facing | Backing | | | |
| 1" 6061 Al/¼" HHS | 2.5 psf HB25 | 27.2 | +232 fps | Not tested |
| | 3.0 psf HB25 | 27.7 | −42 | Not tested |
| | 3.5 psf HB25 | 28.2 | +419 | Not tested |
| | 1.25 psf Ten/ 1.25 psf HB25 | 27.2 | +152 | Not tested |
| | 1.50 psf Ten/ 1.50 psf HB25 | 27.7 | +144 | Not tested |
| | 1.75 psf Ten/ 1.75 psf HB25 | 28.2 | +564 | +1000 |
| 1.5" 6061 Al/¼" HHS | 1.30 psf HB25 | 33.1 | +412 | Not tested |
| | 1.25 psf Ten/ 1.25 psf HB25 | 33.1 | >+464 | Not tested |
| | 1.60 psf Ten | 33.4 | +390 | +1639 |

*Rqmt.- Requirement.
**Frag. - Fragmentation

Table 9 includes ballistic test results for a simulated spall liner including the following various configurations: 1) a baseline configuration of ¼" Ultra High Hard Steel (UHHS) and 1.1 psf of KEVLAR® Reinforced Plastic (KRP), 2) baseline plus 25-mm of HB25 spaced 25-mm behind the KRP, 3) baseline plus 25-mm of high modulus components comprised of 25% Tensylon and 75% HB25 spaced 25-mm behind the KRP, and 4) baseline plus 25-mm of high modulus components comprised of 50% Tensylon and 50% HB25 spaced 25-mm behind the KRP. Test results included the spall cone angle measured at layers 1 and 3 and the average number of fragments that penetrated at layers 1 and 3. The spall cone angle and average number of fragments through for a spall liner including 25% and 50% Tensylon tape were similar to those obtained for a spall liner of 100% HB25.

TABLE 9

Ballistic Data Summary-Simulated Spall Liner, 20 mm FSP:

| Material | Spall Cone Angle (degrees) | | Average # of Fragments Through | |
|---|---|---|---|---|
| | Layer 1 | Layer 3 | Layer 1 | Layer 3 |
| Baseline Configuration: ¼" UHHS + 1.1 psf KRP | 66.44 | 61.70 | 214.5 | 35.0 |
| Baseline with: 25-mm HB25 spaced 25-mm behind KRP | 51.12 | 35.04 | 88.50 | 11.0 |
| Baseline with: 25-mm 25% Tens/75% HB25 spaced 25-mm behind KRP | 56.46 | 36.75 | 89.50 | 10.5 |
| Baseline with: 25-mm 50% Tens/50% HB25 spaced 25-mm behind KRP | 52.58 | 32.57 | 103.0 | 9.0 |

In another embodiment, ballistic-resistant panels were constructed using Tensylon tape as the high modulus component to determine the effect of molding pressure and temperature on ballistic resistance. Table 10 includes ballistic test results for 2.0 psf panels comprised of cross-plied layers of 1.62-inch width Tensylon UHMWPE tape, with a first series of panels molded at 150 psi and at various temperatures and a second series of panels molded at 500 psi and at various temperatures. The cross-plied layers of Tensylon UHMWPE tape were interleaved with a low density polyolefin scrim (Spunfab PO4605) and pressed and bonded at the various pressures and temperatures recorded in the table. The last entry in Table 10, Tensylon*, was comprised of layers of 1.62-inch Tensylon tape woven into a fabric using a basket weave with the weft arranged at 90° with respect to the warp. The woven layers were pressed with an 18-micron low density polyethylene film to form a 2.2 psf ballistic-resistant panel. The ballistic-resistant panels were tested with .30 caliber FSP rounds per MIL-P-46593A and the average $V_{50}$ velocities recorded.

TABLE 10

Test Results of 2.0 psf Ballistic-resistant panels at Molding Pressures 150 psi and 500 psi and at various Temperatures:

| High Modulus Component | Molding Pressure (psi) | Temperature (degrees F.) | Average $V_{50}$ (fps) |
|---|---|---|---|
| Tensylon B1 | 150 | 200 | 1601 |
| Tensylon B1 | 150 | 210 | 1702 |
| Tensylon B1 | 150 | 220 | 1630 |
| Tensylon B1 | 150 | 230 | 1689 |
| Tensylon B1 | 150 | 240 | 1611 |
| Tensylon B1 | 150 | 250 | 1634 |
| Tensylon B1 | 150 | 260 | 1577 |
| Tensylon B1 | 150 | 270 | 1543 |
| Tensylon B1 | 150 | 280 | 1551 |
| Tensylon B1 | 500 | 180 | 1790 |
| Tensylon B1 | 500 | 190 | 1717 |
| Tensylon B1 | 500 | 200 | 1692 |
| Tensylon B1 | 500 | 210 | 1647 |
| Tensylon B1 | 500 | 220 | 1588 |
| Tensylon B1 | 500 | 230 | 1593 |
| Tensylon B1 | 500 | 240 | 1566 |
| Tensylon B1 | 500 | 250 | 1649 |
| Tensylon B1 | 500 | 260 | 1703 |
| Tensylon* | 500 | 250 | 1826 |

*2.2 psf panel formed of Tensylon 0/90 weave with 1" tape.

Figure 6:
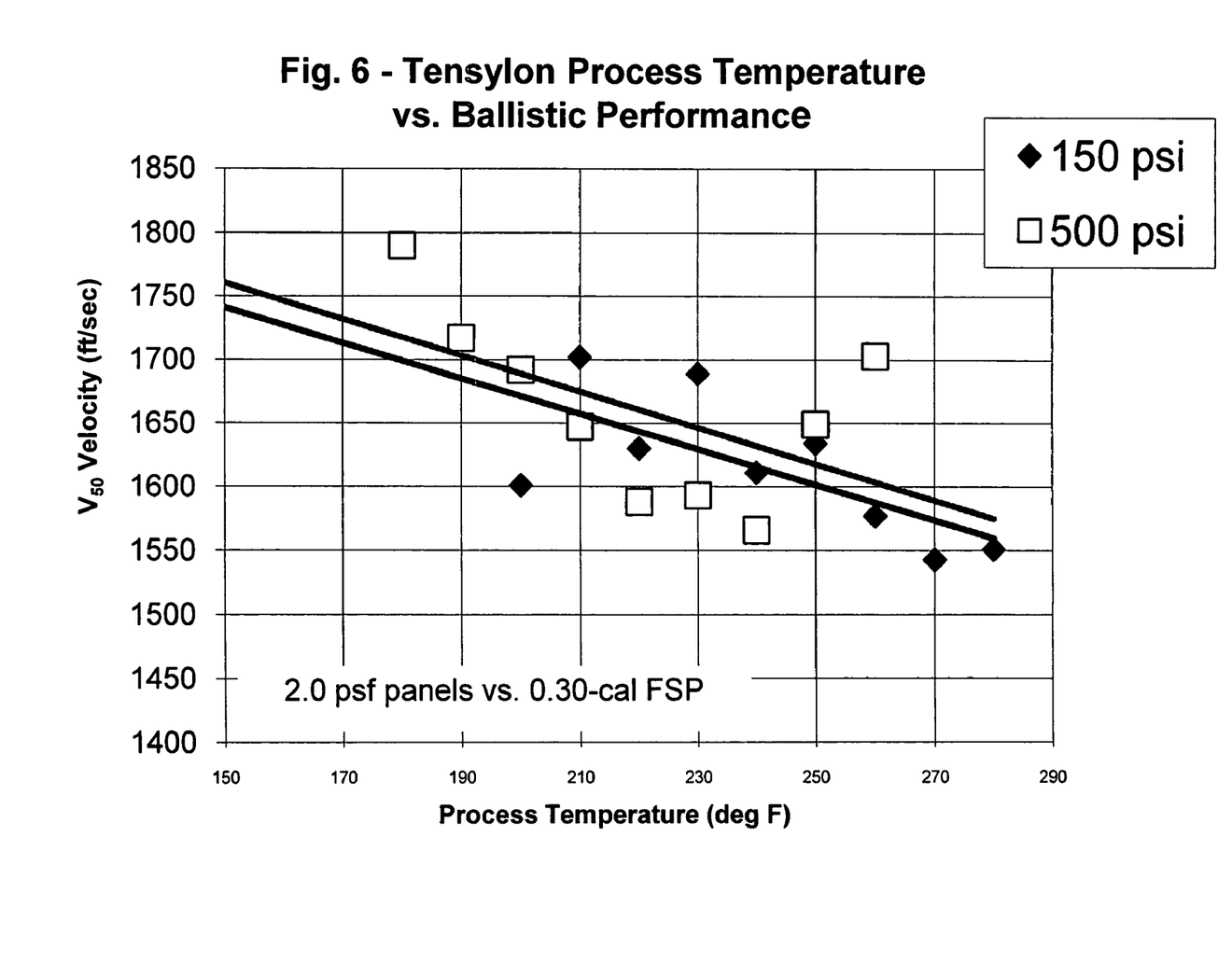
FIG. 6 is a graph depicting ballistic resistance at various molding temperatures and at two separate molding pressures for 2.0 psf panels having 100% Tensylon tape as the high modulus component.

As shown in FIG. 6, the resultant average $V_{50}$ values for the Tensylon B1 panels of Table 10 were plotted versus temperature and a regression line fitted each series of data points. The ballistic resistance of the panels generally increased as the molding temperature was decreased.

Although the embodiments of ballistic-resistant panels describe above were prepared at specific parameters, other variations of processing conditions are possible without departing from the scope of the invention. For example, although the Tensylon UHMWPE tape in adjacent layers of the ballistic-resistant panel were oriented at 0° and 90° respectively, other orientations are possible, such as 0° and 45° in adjacent layers, or 0°, 45°, and 90° for each three successive layers. Preferably the direction of orientation of the tape in each of the interleaved layers of non-fibrous ultra high molecular weight polyethylene tape is at an angle of at least 30 degrees with respect to the direction of orientation of the tape in an adjacent layer. Although the specific molding temperatures tested herein were between 180 and 280° F., it is believed that molding temperatures between 150° F. and 300° F. are acceptable for forming a ballistic-resistant panel according to the present invention. Although specific molding pressures of 150, 500, and 3000 psi were tested, it is believed that molding pressures between 100 and 4000 psi are acceptable for forming ballistic-resistant panels according to the present invention.

Although in one embodiment herein the Tensylon tape was woven into a fabric using a basket weave, it is within the scope of the present invention to form the Tensylon tape into fabric using any fabric weave, such as plain weave, twill weave, satin weave, and the like.

Having thus described the invention with reference to a preferred embodiment, it is to be understood that the invention is not so limited by the description herein but is defined as follows by the appended claims.

What is claimed is:

1. A ballistic-resistant panel comprising:
   a metallic strike-face;
   a backing including a plurality of interleaved layers of non-fibrous ultra high molecular weight polyethylene (UHMWPE) tape; and
   said UHMWPE tape including a tensile modulus of at least 1,400 grams per denier.

2. The ballistic-resistant panel of claim 1 wherein said metallic strike-face includes a layer of high hardness steel and a layer of aluminum.

3. The ballistic-resistant panel of claim 2 wherein
   said layer of high hardness steel is 0.25 inch thick;
   said layer of aluminum is 1.5 inches thick; and
   said aluminum is grade 6061 aluminum.

4. The ballistic-resistant panel of claim 1 wherein said backing includes an areal density of 1.6 pounds per square foot.

5. The ballistic-resistant panel of claim 1 wherein said UHMWPE tape includes
   strips of tape having a width of at least 1.0 inch;
   a viscosity-average molecular weight of at least 2,000,000; and
   a thickness of between 0.0015 and 0.004 inch.

6. The ballistic-resistant panel of claim 1 including an adhesive on at least one side of said interleaved layers of said non-fibrous UHMWPE tape.

7. A ballistic-resistant panel comprising:
   a metallic strike-face;
   a backing including a first portion and a second portion;
   said first portion consisting of a plurality of interleaved layers of non-fibrous ultra high molecular weight polyethylene (UHMWPE) tape; and
   said second portion consisting of a plurality of interleaved layers of cross-plied fibers embedded in resin.

8. The ballistic-resistant panel of claim 7 wherein said UHMWPE tape includes a tensile modulus of at least 1,400 grams per denier.

9. The ballistic-resistant panel of claim 7 wherein said metallic strike-face includes a layer of high hardness steel and a layer of aluminum.

10. The ballistic-resistant panel of claim 7 wherein
said layer of high hardness steel is 0.25 inch thick; and
said layer of aluminum is 1.0 inch thick.

11. The ballistic-resistant panel of claim 7 wherein said aluminum is grade 6061 aluminum.

12. The ballistic-resistant panel of claim 7 wherein said backing includes an areal density of at least 2.5 pounds per square foot.

13. The ballistic-resistant panel of claim 7 wherein said UHMWPE tape includes
strips of tape having a width of at least 1.0 inch;
a viscosity-average molecular weight of at least 2,000,000; and
a thickness of between 0.0015 and 0.004 inch.

14. The ballistic-resistant panel of claim 13 wherein said tape strips include a width to thickness ratio of at least 400:1 and a denier of 6,000 or greater.

15. A ballistic-resistant panel comprising:
a plurality of layers of non-fibrous ultra high molecular weight polyethylene (UHMWPE) tape;
each of said layers of non-fibrous UHMWPE tape including a plurality of monolithic tape strips woven together to form a woven layer;
said non-fibrous UHMWPE tape strips including a modulus of greater than 1,400 grams per denier;
said plurality of woven layers of non-fibrous UHMWPE tape molded together by heat and pressure.

16. The ballistic-resistant panel of claim 15 wherein said ballistic-resistant panel includes an areal density of 2.2 pounds per square foot.

17. The ballistic-resistant panel of claim 15 wherein
each of said woven layers are interleaved with a low density polyethylene film, said low density polyethylene film acting as a binder for binding together said woven tape strips upon application of heat and pressure; and
said low density polyethylene film is 18-microns thick.

18. The ballistic-resistant panel of claim 15 wherein said non-fibrous UHMWPE tape includes
a viscosity-average molecular weight of at least 2,000,000;
a width of at least 1.0 inch; and
a thickness of between 0.0015 and 0.004 inch.

19. The ballistic-resistant panel of claim 15 wherein said heat of molding is 250 degrees F. and said pressure is 500 psi.

* * * * *